Sept. 20, 1966  L. J. MELHART  3,274,540
HIGH ENERGY SONIC AND ULTRA-SONIC
MAGNETOSTRICTION TRANSDUCER
Filed Dec. 30, 1964  3 Sheets-Sheet 1

INVENTOR
LEONARD J. MELHART

BY *Melvin L. Crane* AGENT

*R. S. Sciascia* ATTORNEY

INVENTOR
LEONARD J. MELHART

Sept. 20, 1966     L. J. MELHART     3,274,540
HIGH ENERGY SONIC AND ULTRA-SONIC
MAGNETOSTRICTION TRANSDUCER
Filed Dec. 30, 1964                                  3 Sheets-Sheet 3

INVENTOR
LEONARD J. MELHART

BY *[signature]* AGENT

*[signature]* ATTORNEY

United States Patent Office 3,274,540
Patented Sept. 20, 1966

3,274,540
HIGH ENERGY SONIC AND ULTRA-SONIC
MAGNETOSTRICTION TRANSDUCER
Leonard J. Melhart, Oxon Hill, Md., assignor to the United States of America as represented by the Secretary of the Navy
Filed Dec. 30, 1964, Ser. No. 422,465
5 Claims. (Cl. 340—11)

The invention described herein may be manufactured and used by or for the Government of the United States of America for governmental purposes without the payment of any royalties thereon or therefor.

The present invention is directed to magnetostriction transducers and more particularly to high energy sonic and ultrasonic magnetostriction transducers adaptable for use in underwater sound echo ranging and depth finding.

Heretofore magnetostrictive transducer operation has been limited in energy output by the capability of the switches used and the size of the nickel stack, frequency limits were limited by the number of coil turns and the natural period of the nickel stack. The transducers use wire wound coils in which the current is limited by the size of the wire.

The present invention overcomes the disadvantages of the prior art devices by the use of a single turn coil. The coil is made tube-like and split along its length to form ends along the slit with flanges to which the current input is connected. Such a coil can carry very high currents and the device is limited by the capability to transport the weight of the capacitor electrical installation and the transducer.

It is therefore an object of the invention to provide a transducer system which may use large capacitor banks as an energy source.

Another object is to provide a system capable of using inductance switching for high energy compatible with the high frequency.

Still another object is to provide a system in which the energy of the system is not limited by the transducer coil arrangement.

Yet another object is to provide a powerful magnetostriction transducer for echo ranging and depth finding.

Other objects and advantages of the invention will hereinafter become more fully apparent from the following description of the annexed drawings wherein.

Figure 1:
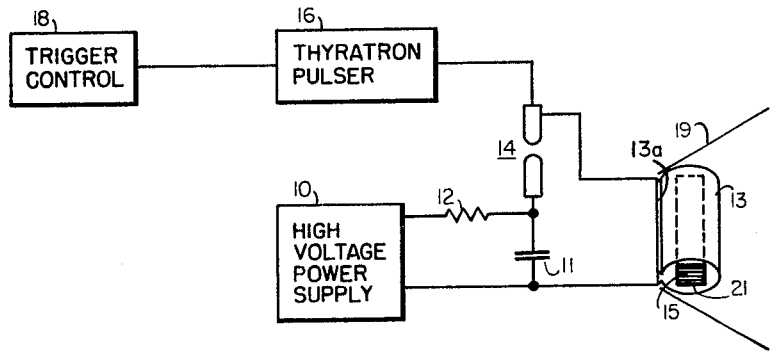
FIG. 1 illustrates the electrical system and the transducer coil.

The present invention is directed to a stack of magnetostrictive material such as nickel surrounded by a low inductance elongated single turn coil. A high energy storage capacitor bank is charged by a high voltage power supply through a charging resistor. The capacitor bank is discharged through a high energy low inductance spark gap switch into the low inductance single turn coil by a pulse supplied to the spark gap switch by a trigger control through a Thyratron pulser. A magnetic field set up in the coil cuts the magnetostrictive material to operate the transducer as is well known in the art.

Now referring to the drawing, wherein like elements are represented by the same reference characters, there is shown by illustration in the drawing, a magnetostrictive transducer system made in accordance with this invention. The system includes a high voltage power supply 10 that charges a high energy storage capacitor 11 through a charging resistor 12 in the power supply line. One side of the storage capacitor is connected to one side of a low inductance elongated single turn coil 13, such as a split cylinder, with flanged ends 13a along the split, (as shown more clearly in FIG. 3) to which electrical connections are made and the other side is connected through a high energy-low inductance spark gap switch 14 to the other side of the single turn coil. The single turn coil surrounds a transducer core 15 such as a bar formed by a stack of rectangular laminations made from a magnetostrictive material such as nickel, "Permedur" or nickel alloy. (The high energy-low inductance spark gap switch may be made according to the switch described in Patent No. 2,936,390). A Thyratron pulser 16 is controlled by a trigger control 18 and suitable deflection plates 19 are provided at each end of the magnetostrictive material bar for directing the sound energy in the desired direction.

The magnetostrctive material is made up of thin laminations in which opposite faces are electrically insulated from each other with each lamination exposed to the exciting field of the single turn coil. Any number of laminations can be fastened together to form the core of the transducer and insulated from each other by the use of an oxide coating, cured varnish, glass cloth, a ceramic gauze, mylar or any other suitable insulating material well known in the art. The length of the laminated pieces may be determined by the formula $l = c/2f$ where $c$ is the velocity of sound through the material and $f$ is the frequency. The bar is rounded at the corners and a suitable insulating material 21 is placed around the bar between the bar and the single turn coil, as is well known in the art.

In operation, the transducer core is assembled within the single turn coil, the baffle plates are secured in place and the electrical circuit is correctly assembled and electrically secured to the flanges of the single turn coil. The transducer is placed in a desired environment for operation. The capacitor is charged by the high voltage power supply through the line resistor. The trigger control is operated to produce a pulse from the thyratron pulser which pulses the low inductance spark gap switch, the electrical pulse ionizes the gases between the switch electrodes. The capacitor then discharges through the spark gap switch and produces current flow around the inner surface of the single turn coil. The current flow produces an axial magnetic field along the single turn coil subjecting the magnetostrictive material to the magnetic field. The magnetostrictive material then reacts to change its linear dimension by expansion and contraction as is well known in the field.

Since the spark gap switch is a high energy-low inductance switch and the single turn coil is of low inductance the device can be operated with much higher values than prior art transducers. By using the spark gap switch, the discharge of the capacitor is a damped waveform which resonates with the transducer core. Operable elements may be a 20 microfarad capacitor with a high voltage at 20,000 volts to produce an energy value of 4000 joules.

Figure 2:
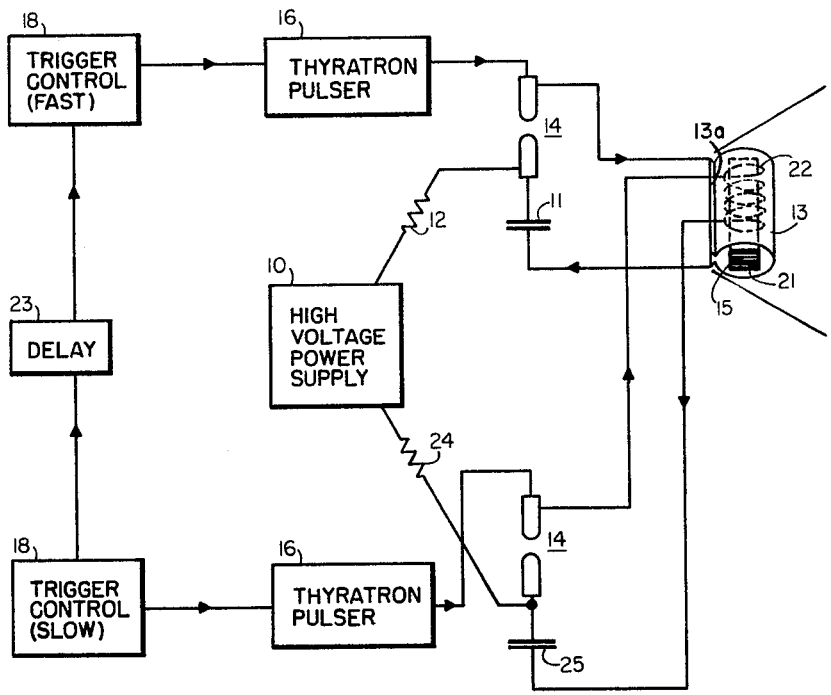
FIG. 2 illustrates the system shown by FIG. 1 which further includes a polarizing circuit.

FIG. 2 is directed to a circuit for exciting a transducer including a separately wound, many turn coil 22 wound about the magnetostrictive material between a single turn coil 13 and the magnetostrictive material 15. The coil is shown as a circular form in cross-section, however, the coil could be oval or non-circular, if desired. The circuit for operation of the double coil transducer includes two separate circuits as described above for the single coil transducer shown by illustration in FIG. 1. A "slow"

circuit for the many turn coil and a "fast" circuit for the single turn coil, with a delay line 23 electrically connected between the slow trigger control for the many turn coil and the fast trigger control for the single turn coil. The value of the resistor 24 and the capacitor 25 in the "slow" circuit to the many turn coil may differ over that of the charging resistor 12 and the capacitor 11 of the "fast" circuit to the single turn coil.

In operation of the system shown by FIG. 2, each of the capacitors are charged. The slow circuit trigger control for the many turn coil is triggered which triggers the spark gap switch of the slow circuit to discharge capacitor 25 to pass a current through the many turn coil to set up a polarizing current for the transducer core. Simultaneously, a current is directed through the delay line to the trigger control of the "fast" circuit. After a desired delay the "fast" circuit trigger control initiates a discharge through the single turn coil as described for the system described above in FIG. 1. The result of passing a polarizing current through the single turn coil is to reduce the frequency by one-half while doubling the amplitude of motion of the transducer core.

FIGS. 1 and 2 illustrate the use of a single turn coil about the magnetostrictive material core wherein the magnetostrictive material core is made of a plurality of laminated pieces surrounded by the core. The single turn coil may be made with multiple sections since the current flows mainly along the inner surface of the arrangement.

Figure 3:
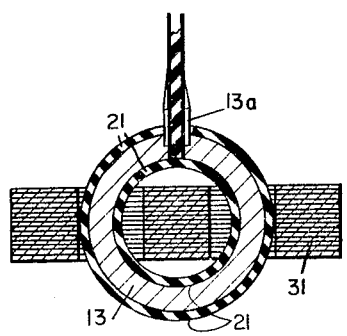
FIGS. 3 and 4 illustrate cross-sectional views of a single turn coil with a modified transducer coil.
Figure 4:
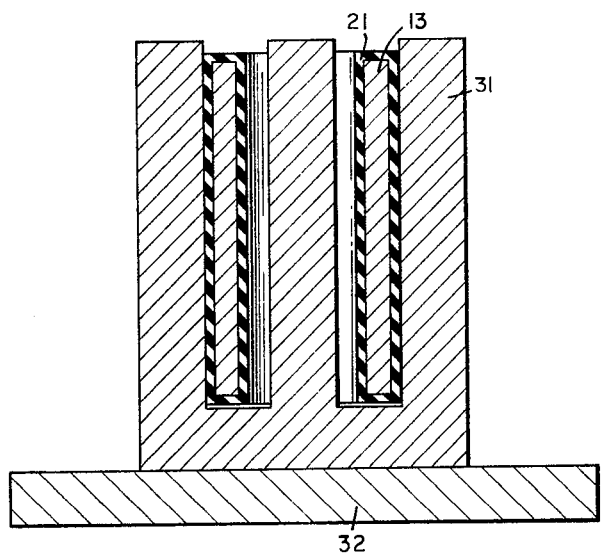

FIGS. 3 and 4 illustrate cross-sectional views of a single coil 13 with the laminations 31 in the form of an E having leg portions with the center leg through the coil and the outer two legs along the outer surface of the coil. The ends of the E-shaped laminations are connected to complete the magnetic field circuit in the laminations and a diaphragm 32 is secured thereto.

Figure 5:
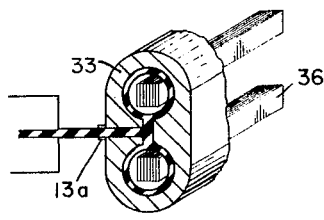
FIGS. 5, 6 and 7 illustrate different coil-lamination arrangements.
Figure 7:
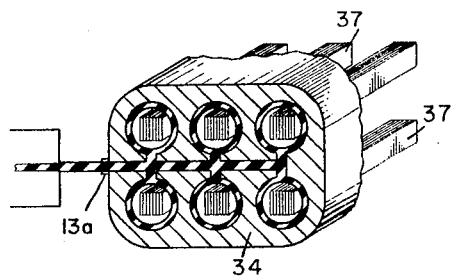
Figure 6:
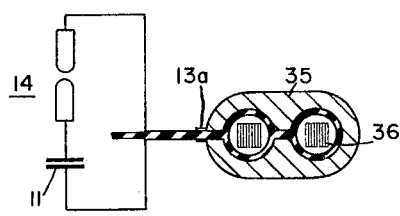

FIGS. 5, 6 and 7 illustrate different coil-lamination arrangements which can be made by using a series of single wound 33, 34, and 35 coils connected together as one. The laminations 36 and 37 each have leg portions that extend through the openings within the coils. The laminations are connected together at the ends to complete the magnetic field circuit and provided with a suitable diaphragm to transmit the vibrations to the surrounding water or other medium within which the device is to operate.

Figure 8:
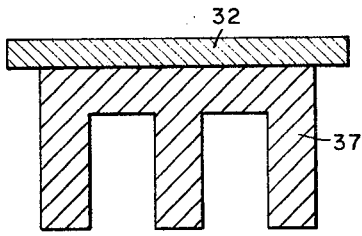
FIGS. 8 and 9 illustrate cross-sectional views of different magnetostrictive element arrangements.
Figure 9:
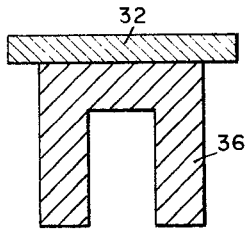

FIGS. 8 and 9 illustrate cross-sectional views of different transducer cores illustrating separate leg portions which may be used with different coil arrangements. The core of FIG. 8 could be used with the transducer shown by illustration in FIG. 7 and the core shown in FIG. 9 could be used with the coil arrangement of FIG. 5 or FIG. 6.

In each of the different modifications the coil is insulated from the core and the core is connected with a diaphragm to transmit the vibrations from the core to the surrounding water as is well known in the art. The operation of the different modifications are the same as was explained for the system shown by illustration in FIG. 1.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A transducer comprising:
   a stack of identical laminations of magnetostrictive material pressed tightly together to form a transducer core, and
   an elongated tubular element axially split through one side to form a single turn coil,
   said single turn coil surrounding at least one portion of said transducer core.

2. A transducer comprising:
   a stack of identical laminations of magnetostrictive material pressed tightly together to form a transducer core,
   said transducer core including at least two leg portions joined at one end thereof, and
   a single piece elongated element,
   said single piece elongated element comprising at least two coil sections, one section substantially surrounding each of said leg portions of said transducer core.

3. A transducer core as claimed in claim 2 wherein said transducer core includes more than two leg portions, and
   said single elongated element includes more than two coil sections, each of which substantially surrounds one each of said leg portions of said transducer core.

4. A transducer system which comprises:
   a stack of identical laminations of magnetostrictive material pressed tightly together to form a transducer core with at least one leg portion,
   an elongated tubular element split axially through one side along the entire length thereof to form a single turn coil,
   said single turn coil surrounding at least one leg portion of said transducer core,
   said single turn coil including a flange along the surfaces of said coil along the split therethrough,
   a high energy capacitor electrically connected with the flanges on said single turn coil, through an appropriate electrical circuit,
   a high energy, low inductance spark gap switch in said capacitor circuit connected with said single turn coil,
   a high energy source connected across said capacitor for charging said capacitor and
   a control circuit connected with said spark gap switch for discharging said capacitor through said single turn coil.

5. A transducer system as claimed in claim 4 which includes an electrical circuit for polarizing said transducer core prior to discharge of said capacitor electrically connected with said single turn coil.

References Cited by the Examiner

UNITED STATES PATENTS

| | | | |
|---|---|---|---|
| 1,882,398 | 10/1932 | Pierce. | |
| 2,328,496 | 8/1943 | Rocard | 340—11 |
| 2,930,912 | 3/1960 | Miller. | |
| 2,957,994 | 10/1960 | Dickey | 340—11 |
| 3,059,217 | 10/1962 | Boswell | 340—11 |

CHESTER L. JUSTUS, *Primary Examiner.*

G. M. FISHER, *Assistant Examiner.*